(12) United States Patent
Krohlow et al.

(10) Patent No.: US 12,172,114 B2
(45) Date of Patent: Dec. 24, 2024

(54) AIR FILTER COMPRISING A PRIMARY AIR OUTLET AND A SECONDARY AIR OUTLET AND FILTER ELEMENT FOR SAME

(71) Applicant: MANN+HUMMEL GmbH, Ludwigsburg (DE)

(72) Inventors: Matthias Krohlow, Herrenberg (DE); Daniel Schmid, Sachsenheim (DE); Martin Sonntag, Freiberg (DE); Steffen Pfannkuch, Ludwigsburg (DE); Martin Schmid, Reisbach (DE); Christoph Wittmers, Bietigheim-Bissingen (DE); Robert Hasenfratz, Schwaebisch Hall (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 316 days.

(21) Appl. No.: 17/746,294

(22) Filed: May 17, 2022

(65) Prior Publication Data
US 2022/0274039 A1    Sep. 1, 2022

Related U.S. Application Data

(63) Continuation of application No. PCT/EP2020/082184, filed on Nov. 16, 2020.

(30) Foreign Application Priority Data

Nov. 18, 2019   (DE) ...................... 10 2019 131 037.7

(51) Int. Cl.
*B01D 46/00*    (2022.01)
*B01D 46/14*    (2006.01)

(52) U.S. Cl.
CPC ......... *B01D 46/0004* (2013.01); *B01D 46/14* (2013.01); *B01D 2271/027* (2013.01)

(58) Field of Classification Search
CPC ........................... B01D 46/0004; B01D 46/14
See application file for complete search history.

(56) References Cited

U.S. PATENT DOCUMENTS

| 3,589,108 | A | 6/1971 | Dingel et al. |
| 8,404,021 | B2 * | 3/2013 | Gillingham ........ B01D 46/4272 55/428 |

(Continued)

FOREIGN PATENT DOCUMENTS

| DE | 10020538 A1 | 10/2001 |
| DE | 202005003046 U1 | 7/2006 |

(Continued)

*Primary Examiner* — Robert A Hopkins

(57) ABSTRACT

An air filter has a filter housing having a raw air inlet and further has a filter element arranged in the filter housing. The filter element has a filter medium body and an end disk with a central primary air passage and a secondary air passage. The filter medium body annularly surrounds a longitudinal axis of the filter element and separates a raw side in the filter housing from a clean side inside the filter element. The filter housing has a primary air outlet communicating through the primary air passage with the clean side of the filter element. The filter housing has a secondary air outlet communicating through the secondary air passage with the clean side of the filter element. The secondary air outlet communicates with the secondary air passage through a channel arranged at the filter element, wherein the channel surrounds the primary air passage annularly and coaxially.

27 Claims, 4 Drawing Sheets

(56) References Cited

U.S. PATENT DOCUMENTS

| | | |
|---|---|---|
| 2014/0260136 A1 | 9/2014 | Kaiser |
| 2015/0033684 A1 | 2/2015 | Pettersson |
| 2015/0192044 A1 | 7/2015 | Pettersson |
| 2018/0369732 A1 | 12/2018 | Karlsson et al. |

FOREIGN PATENT DOCUMENTS

| | | | | |
|---|---|---|---|---|
| DE | 2008049806 A1 | * | 4/2010 | .............. B60T 17/02 |
| JP | 2016108996 A | | 6/2016 | |

* cited by examiner

AIR FILTER COMPRISING A PRIMARY AIR OUTLET AND A SECONDARY AIR OUTLET AND FILTER ELEMENT FOR SAME

CROSS-REFERENCE TO RELATED APPLICATIONS

This application is a continuation application of international application No. PCT/EP2020/082184 having an international filing date of 16 Nov. 2020 and designating the United States, the international application claiming a priority date of 18 Nov. 2019 based on prior filed German patent application No. 10 2019 131 037.7, the entire contents of the aforesaid international application and the aforesaid German patent application being incorporated herein by reference.

BACKGROUND OF THE INVENTION

The invention concerns an air filter with a raw air inlet, a primary air outlet, and a secondary air outlet. The invention concerns moreover a filter element for such an air filter.

Air filters with a primary air outlet and a secondary air outlet for filtered air are used, for example, in internal combustion engines of motor vehicles. The primary air outlet serves typically for providing (filtered) clean air for use in the combustion in the internal combustion engine. The secondary air outlet can serve, for example, for providing (filtered) clean air for use in an exhaust gas manifold of the internal combustion engine, in particular for exhaust gas after treatment.

EP 1 451 464 B1 describes an intake air filter for an internal combustion engine, with a filter housing comprising a raw air inlet and a clean air outlet as well as a clean-side secondary air outlet. The intake air filter comprises an annular filter insert arranged in the filter housing and flowed through radially from the exterior to the interior. At an axial end, the annular filter insert comprises a first end disk that comprises at least one opening through which the clean air outlet communicates with an interior of the annular filter insert. At an axial end that is facing away from the first end disk, the annular filter insert comprises a second end disk that comprises at least one opening through which the secondary air outlet communicates with the interior of the annular filter insert, wherein a connection socket is embodied at the second end disk.

A similar air filter is also disclosed in WO 2017/103048 A1.

WO 2017/172017 A1 describes a filter element with an annular filter body which encloses an interior in circumferential direction. A main connector is embodied in an end disk of the filter element and is connected in fluid communication to the interior. The filter body comprises a channel that extends axially and is radially open, wherein an auxiliary connector that is connected in fluid communication to the interior is arranged in the region of the channel.

SUMMARY OF THE INVENTION

It is object of the invention to provide an air filter with a primary air outlet and a secondary air outlet in which a flow through the primary air outlet is not significantly affected by a flow through the secondary air outlet and which preferably can be used instead of an existing air filter without a secondary air outlet. Moreover, it is object of the invention to provide a filter element for such an air filter.

This object is solved by an air filter comprising a filter housing with a raw air inlet and a filter element that is arranged in the filter housing and that comprises a filter medium body which annularly surrounds a longitudinal axis of the filter element, wherein the filter medium body separates a raw air side in the filter housing from a clean side inside the filter element, wherein the filter element comprises a first end disk with a central primary air passage and at least one secondary air passage, wherein at the filter housing a primary air outlet is embodied that communicates through the primary air passage with the clean side of the filter element, and wherein at the filter housing a secondary air outlet is embodied that communicates through the secondary air passage with the clean side of the filter element, wherein the secondary air outlet communicates with the at least one secondary air passage through a channel of the filter element which surrounds the primary air passage annularly and coaxially.

The object is further solved by a filter element, in particular for an air filter according to the invention, with a filter medium body, which annularly surrounds a longitudinal axis of the filter element, wherein the filter medium body can be flowed through in radial direction from the exterior to the interior to a clean side inside of the filter element in a region of an inner cavity of the filter medium body, wherein the filter element comprises a first end disk with a central primary air passage and at least one secondary air passage, wherein the at least one secondary air passage is present radially outside of the primary air passage and is embodied as a perforation of the end disk that is closed at least in radial direction inwardly, wherein the at least one secondary air passage opens into a channel at the first end disk which is separated from the primary air passage and annularly and coaxially surrounds the primary air passage.

Preferred embodiments are disclosed in the respective dependent claims and the description.

Air Filter According to the Invention

An air filter is provided according to the invention. In particular, the air filter can serve for supplying an internal combustion engine with filtered combustion air. The air filter comprises a filter housing with a raw air inlet. In operation of the air filter, air to be filtered can flow through the raw air inlet into the filter housing. The air filter comprises moreover a filter element. The filter element is arranged in the filter housing. The filter element comprises a filter medium body. The filter medium body surrounds annularly a longitudinal axis of the filter element. Directional information such as, for example, radial or axial relate to the longitudinal axis of the filter element in the context of the description of the present invention. The filter element or its filter medium body separates a raw side in the filter housing from a clean side inside the filter element. The filter element therefore can be flowed through radially from the exterior to the interior. In other words, the raw side is formed between the filter element and the filter housing. The raw side and the clean side can also be referred to as raw space or clean space.

The filter element comprises a first end disk. In the first end disk, a primary air passage and at least one secondary air passage are embodied in accordance with the invention. The primary air passage is arranged centrally at the first end disk. In particular, the primary air passage can be arranged coaxially to the longitudinal axis. Preferably, a plurality of secondary air passages can be embodied in the first end disk, which can be arranged in particular in annular arrangement about the primary air passage. Filtered air can flow out or be removed through the primary air passage and the at least one secondary air passage from the interior of the filter element, i.e., from the clean side.

The filter element comprises typically a second end disk. The end disks are arranged at oppositely positioned axial ends of the filter element. The second end disk of the filter element is in principle of a closed embodiment. The first and optionally the second end disk are typically connected by material fusion to the filter medium body, in particular, the filter medium body can be embedded in the material of the end disks or can be glued to the end disks. The end disks can be comprised of plastic material or polyurethane foam.

The filter element of the air filter according to the invention can comprise further features of the filter element in accordance with the invention described infra.

A primary air outlet is embodied at the filter housing. The primary air outlet communicates through the primary air passage with the clean side. Moreover, a secondary air outlet is embodied at the filter housing. The secondary air outlet communicates through the at least one secondary air passage with the clean side. In other words, the primary air outlet is connected in fluid communication through the primary air passage to the clean side and the secondary air outlet is connected through the secondary air passage or the secondary air passages. In operation of the air filter, a smaller portion of the clean air typically flows through the secondary air outlet compared to the portion of the filtered clean air flowing through the primary air outlet.

Since the primary air outlet and the secondary air outlet are supplied according to the invention independent from each other with filtered clean air through the primary air passage or the secondary air passage in the first end disk, the flow through the primary air outlet is not or only insignificantly affected by a flow of clean air through the secondary air outlet. In particular, due to the separation of the clean air supply to the two clean air outlets in the filter housing by means of the separate clean air passages in the first end disk, it can be achieved that a velocity profile of the airflow in the primary air outlet is not, or at least not appreciably, affected qualitatively by air flowing or not flowing through the secondary air passage and the secondary air outlet, respectively, by how large a volume flow or mass flow of clean air through the secondary outlet is.

By the separation of the clean air outlets at the filter housing, the primary air outlet can be adapted without problem to an existing connection structure of a device to be supplied with clean air, for example, an internal combustion engine. With the air filter according to the invention, in some aspects of the invention an additional secondary air supply with filtered clean air is provided without having to carry out modifications at the connection structure (to be connected to the primary air outlet) for the main air supply of the device.

The secondary air outlet communicates with the at least one secondary air passage via a channel of the filter element which surrounds annularly and coaxially the primary air passage. The channel can receive a flow of filtered clean air through the secondary air passage independently of the position of the secondary air passage at the circumference of the first end disk. In particular, the channel can combine partial flows of filtered clean air through a plurality of, in particular all, secondary air passages of the first end disk and guide them to the secondary air outlet. Furthermore, the channel can ensure a separation of the primary airflow to the primary air outlet and of the secondary airflow to the secondary air outlet.

Preferably, the channel is delimited in radial direction inwardly by inner wall sections at the first end disk and at the filter housing. The inner wall sections can be sealed against each other. In this way, in a constructively simple manner, the separation of the channel from the primary air passage or the primary air outlet can be realized. The inner wall sections can extend in axial direction. In special cases, only the inner wall section at the first end disk or only the inner wall section at the filter housing can comprise an axial extension. Preferably, the inner wall sections (extending in axial direction) overlap each other in axial direction. This can simplify mounting of the filter element in the filter housing. A first seal device can be arranged between the inner wall sections.

Preferably, the channel is delimited in radial direction outwardly by outer wall sections at the first end disk and at the filter housing. The outer wall sections are sealed against each other. In this way, in a constructively simple manner, it can be prevented that unfiltered raw air from the raw side reaches the clean-side channel. The outer wall sections can extend in axial direction. In special cases, only the outer wall section at the first end disk or only the outer wall section at the filter housing can comprise an axial extension. Preferably, the outer wall sections (extending in axial direction) overlap each other in axial direction. This can simplify mounting of the filter element in the filter housing. A second seal device can be arranged between the outer wall sections.

Preferably, the air filter comprises a mass airflow sensor that is connected to the primary air outlet. The mass airflow sensor enables measuring of the mass flow flowing through the primary air outlet or, in special cases, volume flow of filtered clean air. In particular, the mass airflow sensor can be arranged directly at the primary air outlet. This enables an especially compact configuration in axial direction. Since the flow through the primary air outlet is not (noticeably) affected by the supply of the secondary air outlet with filtered clean air through the secondary air passages in accordance with the invention, the mass airflow sensor can be arranged particularly tight at the primary air outlet without its measurement results being affected. The mass airflow sensor can be designed as a hot-film air mass meter.

A housing element of the mass airflow sensor can extend through the primary air outlet. In this manner, the air filter can be designed even shorter in axial direction.

A housing element of the mass airflow sensor can be connected in the region of the primary air passage seal-tightly to the first end disk. This can simplify the attachment of the mass airflow sensor, in particular in respect to the number of required seal locations. Preferably, the sealing connection of the housing element to the first end disk is realized radially inwardly at the secondary air passage. The housing element can then be connected to the filter element particularly easily by insertion in axial direction. The housing element can be connected seal-tightly to an inner wall section of the channel which is embodied at the first end disk. A seal element can be arranged between the housing element and the first end disk.

The secondary air outlet can be embodied at a socket. This facilitates connecting a further device that is to be supplied with filtered clean air through the secondary outlet, for example, an exhaust gas after treatment device, to the filter device. The socket extends preferably at a slant to the longitudinal axis away from the primary air outlet. This is advantageous for the accessibility of the socket when connecting the further device.

Filter Element According to the Invention

A filter element is encompassed furthermore in the scope of the present invention. The filter element can be used in particular in an air filter according to the invention as described supra. The filter element according to the invention can comprise further features of the filter element of the air filter according to the invention as described supra, and vice versa.

The filter medium body of the filter element comprises a filter medium which surrounds annularly a longitudinal axis of the filter element. The filter medium can be flowed through in radial direction from the exterior to the interior to a clean side in a region of an inner cavity of the filter medium body. The filter medium can be comprised of cellulose fibers, synthetic fibers, glass fibers, or mixed media of the aforementioned fiber types.

The filter element comprises a first end disk. A primary air passage and at least one secondary air passage are embodied in the first end disk in accordance with the invention. The primary air passage is arranged centrally at the first end disk. In particular, the primary air passage can be arranged coaxially to the longitudinal axis. The primary air passage and the secondary air passage each are open toward the clean side. In other words, the primary air passage and the secondary air passage each open a flow path from the clean side to an environment of the filter element. Filtered air can flow out or be removed through the primary air passage and the secondary air passage from the interior of the filter element, i.e., from the clean side.

According to the invention, the at least one secondary air passage is located radially outside of the primary air passage and is embodied as a perforation of the end disk that is at least radially inwardly closed. In particular, a circumferentially extending inner edge, which defines the primary air outlet, remains in the region of an inner circumference of the end disk.

The at least one secondary air passage opens into a channel at the first end disk that is separated from the primary air passage and surrounds the primary air passage annularly and coaxially. This ensures a separation of the clean air flows through the primary air passage and the at least one secondary air passage. In this manner, it can be achieved that, in operation of the filter element, the flow through the primary air passage is realized at least largely independent of the flow through the secondary air passage, in particular in respect to a velocity profile.

The filter element comprises typically a second end disk. The end disks are arranged at oppositely positioned axial ends of the filter element. The second end disk of the filter element is in principle of a closed configuration. The first and optionally the second end disk are typically connected by material fusion to the filter medium body, in particular, the filter medium of the filter medium body can be embedded in the material of the end disks or can be glued to the end disks. The end disks can be comprised of a plastic material or of a polyurethane foam.

In a particularly preferred embodiment, the first end disk projects past an inner circumference of the filter medium body in radial direction inwardly and forms a projecting region. In particular, the at least one secondary air passage is arranged in the projecting region. The projecting region is an overhang projecting inwardly past the inner circumference of the filter medium body and embodied in particular disk-shaped. One could also say that the inner diameter of the end disk is smaller than an inner diameter of the filter medium body.

The first end disk comprises preferably a plurality of secondary air passages which are arranged in annular arrangement about the primary air passage, preferably at uniform angular spacings. In this way, a particularly uniform inflow of filtered clean air into the primary passage and the secondary air passages can be realized. In particular, a uniform flow about the (inner) circumference of the filter medium body can be achieved.

The filter medium can be folded in a star shape. In this way, an effective filter surface of the filter medium can be enlarged without the outer dimensions of the filter element being increased. Preferably, a fold height measured in radial direction in the region of the secondary air passages is smaller than a fold height between the secondary air passages. On the one hand, the secondary air passages can be arranged radially farther outwardly in this way, for example, in order to make the primary air passage larger. On the other hand, the folds between the secondary air passages in radial direction can be extended farther inwardly in this way in order to enlarge the filter surface of the filter medium body. Due to the arrangement of the secondary air passages in the region of folds that are less tall, it is ensured in this context that only filtered clean air can flow from the clean side to the secondary air passages.

Preferably, the channel is delimited in radial direction inwardly by a circumferential inner wall section which projects away from the first end disk in axial direction, wherein the inner wall section is arranged radially inside of the at least one secondary air passage of the end disk. The inner wall section extends thus between the at least one secondary air passage and the primary air passage. In other words, the inner wall section separates the channel from the primary air passage. In general, the inner wall section surrounds annularly the primary air passage. The inner wall section is typically embodied as one piece together with the first end disk.

A first seal device can be held at the inner wall section of the first end disk. The first seal device can be embodied with a seal lip that is embodied as one piece together with the inner wall section. Preferably, the first seal device is molded onto the inner wall section. The end disk and the first seal device are thus embodied as a two-component structure. This is advantageous in regard to the manufacture and handling of the filter element as well as the reliable sealing action. When exchanging the filter element, the first seal device is also exchanged. In this way, it can be ensured that the connection of the inner wall section of the first end disk to the filter housing comprises again the required sealing properties upon insertion of a new filter element into a filter housing.

The first seal device can comprise at least one radially outwardly facing seal surface, preferably for sealing in relation to an inner wall section of a filter housing delimiting the channel, and/or a radially inwardly facing seal surface, preferably for sealing in relation to a housing element of a mass airflow sensor. The radially inner and/or outer seal surfaces of the first seal device are in particular arranged on the respective inner and/or outer wall surfaces of the inner wall section of the end disk. The seal surfaces facing radially inwardly or radially outwardly can be embodied as a one-piece seal element of the first seal device. Alternatively, the radially inwardly or radially outwardly facing seal surfaces can be embodied on seal elements of the first seal device that are separate from each other. The one-piece seal element or the separate seal elements can be molded onto the inner wall section. The seal element or seal elements can be comprised of an elastomer. Moreover, it can be provided that the at least one radially inner and/or outer seal surface comprises a plurality of seal lips.

Preferably, the channel is delimited radially outwardly by a circumferentially extending outer wall section that projects away from the first end disk in axial direction. The outer wall section extends thus radially outside of the at least one secondary air passage and is radially spaced apart by a predetermined measure from the inner wall section. Preferably, the outer wall section surrounds annularly the at least one secondary air passage (and the primary air passage). The outer wall section is typically embodied as one piece together with the first end disk. By means of the outer wall section, a raw side can be separated from the clean-side channel when a filter element is mounted in a filter housing.

A second seal device can be held at the outer wall section of the first end disk. The second seal device can be embodied with a seal lip that is formed as one piece together with the outer wall section. Preferably, the second seal device is molded onto the outer wall section. The end disk and the second seal device are thus formed as a two-component structure. This is advantageous in respect to the manufacture and handling of the filter element as well as the reliable sealing action. When exchanging the filter element, the second seal device is also exchanged. In this way, it can be ensured that the connection of the outer wall section of the first end disk to the filter housing comprises again the required sealing properties upon insertion of a new filter element into a filter housing. The second seal device comprises at least one seal surface facing radially outwardly and/or radially inwardly, preferably for sealing in relation to an outer wall section of a filter housing.

Finally, it can also be provided that the inner wall section is arranged at least partially in the projecting region of the first end disk. As has been disclosed farther supra, the projecting region of the first end disk projects past the filter medium body in relation to its inner circumference and forms essentially an "overhang". When the inner wall section is now arranged in the projecting region, this means that the circumferentially extending inner wall section is extending on a diameter that is smaller than an inner diameter of the filter medium body. In this way, a particularly good fluid connection of the secondary air passage to the clean side with little pressure loss is enabled in the region of the cavity of the filter medium body.

BRIEF DESCRIPTION OF THE DRAWINGS

Further features and advantages of the invention result from the following detailed description of an embodiment of the invention, from the claims as well as with the aid of the figures of the drawing showing details according to the invention. The aforementioned and still further disclosed features can be realized individually by themselves or several combined in any expedient combinations in variants of the invention. The features illustrated in the drawing are illustrated such that the particularities according to the invention can be made clearly visible.

DESCRIPTION OF PREFERRED EMBODIMENTS

Figure 1:
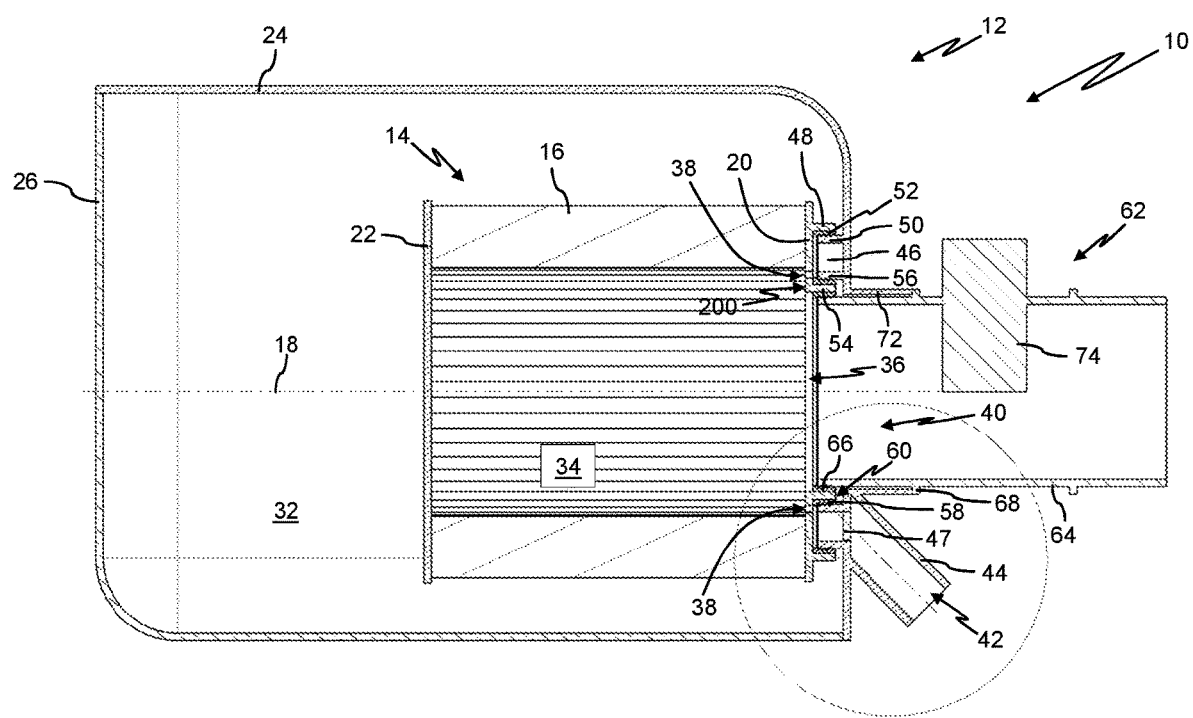
FIG. 1 shows an air filter according to the invention with an annular filter element according to the invention that comprises a first end disk with a central primary air passage and a plurality of secondary air passages arranged annularly about the primary air passage, and with a filter housing at which a central primary air outlet as well as an eccentrically arranged secondary air outlet are embodied, wherein the primary air outlet communicates with the primary air passage and the secondary air outlet communicates via an annular channel with the secondary air passages, in a schematic section view.
Figure 2:
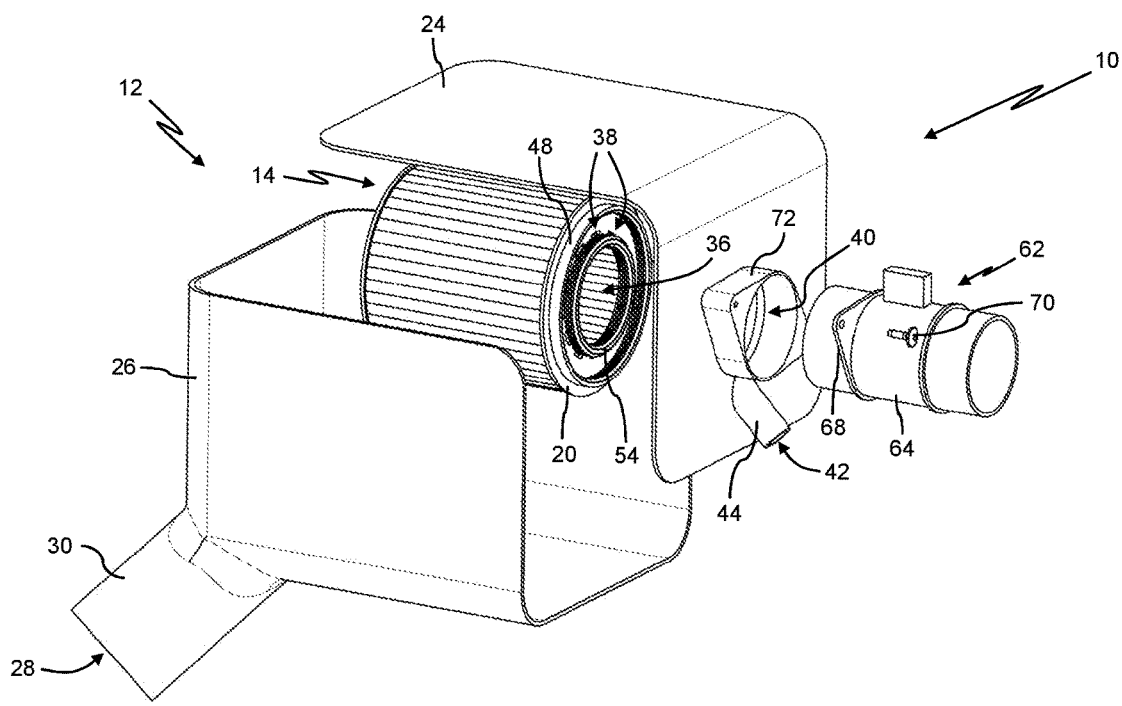
FIG. 2 shows the air filter of FIG. 1 in a schematic exploded illustration.

FIG. 1 shows an air filter 10 in a section view. In FIG. 2, the air filter 10 is shown in an exploded illustration.

The air filter 10 comprises a filter housing 12. In the filter housing 12, a filter element 14 is arranged. The filter element 14 comprises a filter medium body 16. The filter medium body 16 surrounds annularly a longitudinal axis 18 of the filter element 14. The filter element 14 can be flowed through in radial direction from the exterior to the interior. Here, the filter medium of the filter medium body 16 is embodied folded in a star shape. At axial ends of the filter element 14, a first end disk 20 and a second end disk 22 are connected to the filter medium body 16.

Here, the filter housing 12 comprises a first housing part 24 and a second housing part 26. For operation of the filter element 10, the first housing part 24 and the second housing part 26 are attached to each other, compare FIG. 1, for example, locked to each other. For exchange of the filter element 14, the two housing parts 24, 26 can be detached from each other.

The filter housing 12 comprises a raw air inlet 28. Here, the raw air inlet 28 is embodied as a socket 30 at the second housing part 26, see FIG. 2. Within the filter housing 12, the filter element 14 separates a raw side 32 from a clean side 34. The raw side 32 is the space outside of the filter element 14. The clean side 32 is the space within the filter medium body 16 and between the end disks 20, 22. The second end disk 22 is embodied in a closed configuration for separation of the raw side 32 from the clean side 34. The raw side 32 can also be referred to as a raw space and the clean side 34 as a clean space. In operation of the air filter 10, raw air to be filtered flows through the raw air inlet 28 to the raw side 32. From the raw side 32, the air flows through the filter medium body 16 and reaches the clean side 34 as filtered clean air.

The first end disk 20 comprises a primary air passage 36. The primary air passage 36 can be embodied centrally at the first end disk 20. Here, the primary air passage 36 is arranged coaxially to the longitudinal axis 18 of the filter element 14.

The first end disk 20 moreover comprises a plurality of secondary air passages 38. The secondary air passages 38 are arranged annularly about the primary air passage 36. In other words, the secondary air passages 38 surround the primary air passage 36 radially outwardly. The secondary air passages 38 are arranged preferably in the projecting region 200.

The primary air passage 36 and the secondary air passages 38 are embodied respectively as perforations in the first end disk 20. The primary air passage 36 and the secondary air passages 38 each open a flow path from the clean side 34 to an environment of the filter element 14. The secondary air passages 38 (and therefore also the primary air passage 36) are arranged here radially inside of the filter medium body 16. In an embodiment of the air filter 10, not illustrated in detail, individual folds of the star-shaped folded filter medium body 16 could project between neighboring secondary air passages 38 in radial direction past the secondary air passages 38 toward the longitudinal axis 18. The folds between the secondary air passages 38 in this case have a larger fold height—measured in radial direction—than the folds whose circumferential position coincides with one of the secondary air passages 38.

A primary air outlet 40 is embodied at the filter housing 12. The primary air outlet 40 communicates through the primary air passage 36 with the clean side 34. In other words, the primary air outlet 40 is connected via the primary air passage 36 in fluid communication to the clean side 34. In operation of the air filter 10, typically a significant portion of the filtered clean air flows from the clean side 34 through the primary air passage 36 and the primary outlet 40 out of the air filter 10.

A secondary air outlet 42 is furthermore embodied at the filter housing 12. The secondary air outlet 42 can be provided at a socket 44. The socket 44 of the secondary air outlet 42 extends here at a slant away from the longitudinal axis 18. The secondary air outlet 42 communicates via the secondary air passages 38 with the clean side 34. In other words, the secondary air outlet 42 is connected via the secondary air passages 36 in fluid communication to the clean side 34. In operation of the air filter 10, a typically smaller portion of the filtered clean air can flow from the clean side 34 through the secondary air passages 38 and the secondary air outlet 42 out of the air filter 10.

A channel 46 is provided for connecting in fluid communication the secondary air outlet 42 to the secondary air passages 38. All of the secondary air passages 38 open here into the channel 46. The channel 46 surrounds the primary air passage 36 or the primary air outlet 40 annularly. The channel 46 effects a separation of a primary air flow of filtered clean air through the primary air passage 36 and the primary air outlet 40 from a secondary air flow of filtered clean air through the secondary air passages 38 and the secondary air outlet 42.

Figure 3:
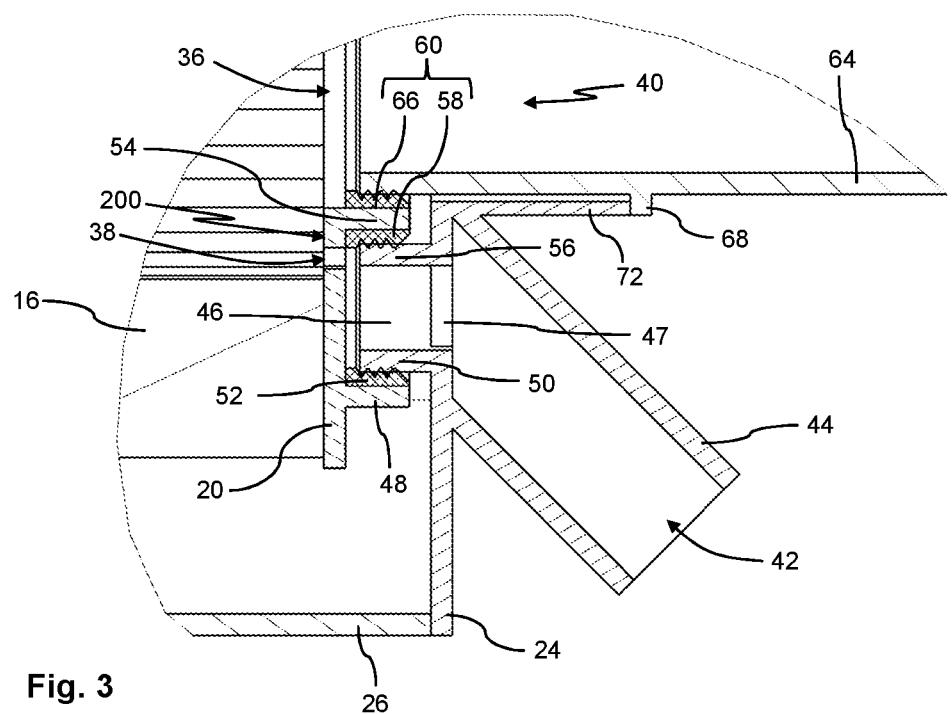
FIG. 3 shows a detail of FIG. 1 in the region of the connection of the filter element to the filter housing and with a mass airflow sensor.

In axial direction away from the filter element 14, the channel 46 can be delimited by a housing wall of the filter housing 12, here of the first housing part 24. In the housing wall, a perforation 47 can be embodied which connects in fluid communication the channel 46 to the secondary air outlet 42, compare also FIG. 3. In axial direction toward the filter medium body 16, the channel 46 can be delimited by the first end disk 20.

The channel 46 can be delimited in radial direction outwardly by outer wall sections 48, 50 at the first end disk 20 or the filter housing 12. The outer wall section 48 is embodied here as one piece together with the first end disk 20. The outer wall section 48 projects in axial direction past a portion of the first end disk 20 extending perpendicularly to the longitudinal axis 18. In other words, the outer wall section 48 projects in axial direction away from the first end disk 20. The outer wall section 50 projects here in axial direction from the first housing part 24 into the interior of the filter housing 12. In other words, the outer wall section 50 projects in axial direction away from the filter housing 12, here its first housing part 24.

The outer wall sections 48, 50 can overlap each other in axial direction. Here, the outer wall section 48 of the first end disk 20 is arranged radially outside of the outer wall section 50 of the filter housing 12.

Between the outer wall sections 48, 50, a seal device 52 can be arranged. The seal device 52 can be held at the outer wall section 48 of the first end disk 20. Here, the seal device 52 is molded onto the outer wall section 48. The first end disk 20 and the seal device 52 thus form a two-component structure. Alternatively, the seal device 52 can be embodied as a separate seal device, e.g., O-ring, held at the outer wall section 48. As a further alternative (not illustrated in the drawing), the seal device 52 can be held at the housing-side outer wall section 50.

The channel 46 can be delimited in radial direction inwardly by inner wall sections 54, 56 at the first end disk 20 or the filter housing 12. The inner wall section 54 can be arranged at least partially in the projecting region 200 of the first end disk 20. The inner wall section 54 is embodied here as one piece together with the first end disk 20. The inner wall section 54 projects in axial direction past a portion of the first end disk 20 extending perpendicularly to the longitudinal axis 18. In other words, the inner wall section 54 projects in axial direction away from the first end disk 20. Here, the inner wall section 56 projects in axial direction from the first housing part 24 into the interior of the filter housing 12. In other words, the inner wall section 56 projects in axial direction away from the filter housing 12, here its first housing part 24. The inner wall section 54 of the first end disk 20 can separate the primary air passage 36 from the channel 46.

The inner wall sections 54, 56 can overlap each other in axial direction. Here, the inner wall section 54 of the first end disk 20 is arranged radially inside of the inner wall section 56 of the filter housing 12. Thus, the outer wall section 50 and the inner wall section 56 of the filter housing 12 extend between the outer wall section 48 and the inner wall section 54 of the filter element 14 in the illustrated air filter 10.

Between the inner wall sections 54, 56, a first seal section 58 of a seal device 60 can be arranged. The seal device 60 can be held at the inner wall section 54 of the first end disk 20. Here, the seal device 60 or the seal section 58 is molded onto the inner wall section 54. Thus, the first end disk 20 and the seal device 60 (and the seal device 52, compare above) form a two-component structure. Alternatively, the seal device 60 can be embodied as a separate seal device, e.g., O-ring, held at the inner wall section 54.

The air filter 10 can comprise a mass airflow sensor 62. The mass airflow sensor 62 is connected in fluid communication to the primary air outlet 40. The mass airflow sensor 62 serves for measuring a mass flow of filtered clean air through the primary air outlet 40. A housing element 64 of the mass airflow sensor 62 can extend through the primary air outlet 40. The housing element 64 is connected here seal-tightly to the first end disk 20. In the illustrated embodiment of the air filter 10, the housing element 64 extends into the primary air passage 36. In axial direction, the inner wall section 54 of the first end disk 20 and the housing element 64 of the mass airflow sensor 62 overlap each other. Between the first end disk 20, here its inner wall section 54, and the housing element 64, a second seal section 66 of the seal device 60 can be arranged. The second seal section 66 is also molded to the inner wall section 54. Presently, the two seal sections 58, 66 of the seal device 60 are embodied separate from each other. In an alternative embodiment, not illustrated in detail, the seal device 60 could comprise a one-piece seal element at which the two seal sections 58, 60 are embodied.

Figure 4:
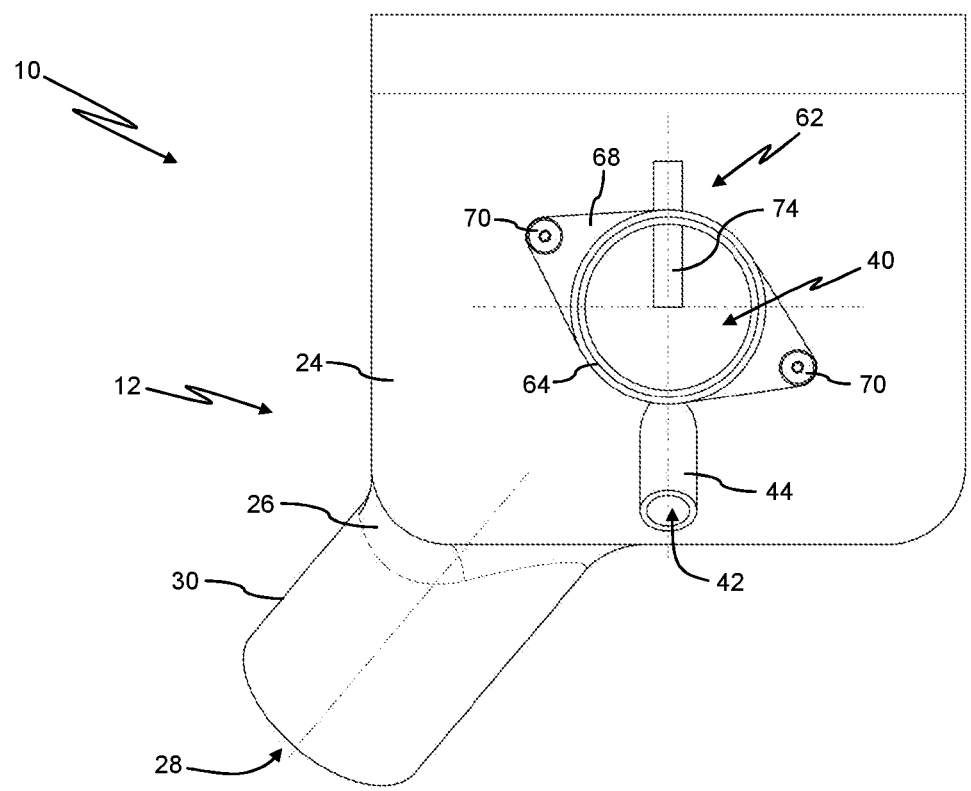
FIG. 4 shows the air filter of FIG. 1 in a schematic view, viewed along a longitudinal axis of the filter element.

In order to establish a defined insertion depth of the housing element 64 in the filter housing 12, a stop 68 can be embodied at the housing element 64. By means of two screws 70 extending through the stop 68, the mass airflow sensor 62 can be fixed at the filter housing 12, here its first housing part 24, compare FIG. 2 and in particular FIG. 4. The screws 70 engage here a socket 72 surrounding the primary air outlet 40.

The mass airflow sensor 62 can be embodied as a hot-film mass airflow sensor with a hot-wire anemometer 74 (illustrated greatly simplified here). In particular in FIGS. 1 and 4, it can be seen that the hot-wire anemometer 74 extends into the housing element 64 of the mass airflow sensor 62. The measuring precision of hot-wire anemometers depends on the type of incoming flow or a velocity profile of the air mass flow passing by. A change of the inflow or of the velocity profile leads to deviations of the measuring results. Due to the connection of the secondary air outlet 42 according to the invention to the clean side 34 by means of the secondary air passages 38 arranged annularly around the primary air passage 36 and opening into the common channel 46, it can be achieved that the flow through the mass airflow sensor 62 is not noticeably affected by the quantity of the clean air removed through the secondary air outlet 42. The air filter 10 according to the invention ensures therefore a particularly precise measurement of the air mass flow through the primary air outlet 40.

What is claimed is:

1. An air filter comprising:
a filter housing comprising a raw air inlet;
a filter element arranged in the filter housing, the filter element comprising a filter medium body and further comprising an end disk, wherein the end disk is connected to the filter medium body and comprises a central primary air passage and at least one secondary air passage, wherein the filter medium body annularly surrounds a longitudinal axis of the filter element and separates a raw side in the filter housing from a clean side inside the filter element;
wherein the filter housing comprises a primary air outlet communicating through the central primary air passage with the clean side of the filter element;
wherein the filter housing comprises a secondary air outlet communicating through the at least one secondary air passage with the clean side of the filter element;
wherein the secondary air outlet communicates with the at least one secondary air passage through a channel arranged at the filter element, wherein the channel surrounds the central primary air passage annularly and coaxially.

2. The air filter according to claim 1, wherein the channel is delimited in a radial direction inwardly in relation to the longitudinal axis by an inner wall section of the end disk and by an inner wall section of the filter housing, wherein the inner wall section of the end disk and the inner wall section of the filter housing are sealed against each other.

3. The air filter according to claim 2, wherein the inner wall section of the end disk and the inner wall section of the filter housing overlap each other axially.

4. The air filter according to claim 2, wherein the channel is delimited in the radial direction outwardly by an outer wall section of the end disk and an outer wall section of the filter housing, wherein the outer wall section of the end disk and the outer wall section of the filter housing are sealed against each other.

5. The air filter according to claim 4, wherein the outer wall section of the end disk and the outer wall section of the filter housing overlap each other axially.

6. The air filter according to claim 1, further comprising a mass airflow sensor connected to the primary air outlet.

7. The air filter according to claim 6, wherein the mass airflow sensor comprises a housing element extending through the primary air outlet.

8. The air filter according to claim 6, wherein the mass airflow sensor comprises a housing element connected sealtightly to the end disk in a region of the primary air passage.

9. The air filter according to claim 8, wherein the housing element is arranged radially inwardly in relation to the at least one secondary air passage.

10. The air filter according to claim 1, wherein the secondary air outlet is a socket.

11. The air filter according to claim 10, wherein the socket extends away from the primary air outlet at a slant to the longitudinal axis.

12. A filter element for an air filter, the filter element comprising:
a filter medium body annularly surrounding a longitudinal axis of the filter element and comprising an inner cavity, wherein the filter medium body is configured to be flowed through in a radial direction in relation to the longitudinal axis from an exterior to an interior to a clean side of the filter element in the inner cavity of the filter medium body;
an end disk connected to the filter medium body and comprising a central primary air passage and further comprising at least one secondary air passage;
wherein the at least one secondary air passage is arranged, viewed in the radial direction, outwardly of the central primary air passage and is a perforation of the end disk, wherein the perforation is closed at least inwardly in the radial direction;
wherein the at least one secondary air passage opens into a channel arranged at the end disk, wherein the channel is separated from the central primary air passage and annularly and coaxially surrounds the central primary air passage.

13. The filter element according to claim 12, wherein the end disk projects in the radial direction inwardly past an inner circumference of the filter medium body and forms a projecting region.

14. The filter element according to claim 13, wherein the at least one secondary air passage is located in the projecting region.

15. The filter element according to claim 12, wherein a plurality of the at least one secondary air passage are arranged in an annular arrangement about the central primary air passage.

16. The filter element according to claim 15, wherein the plurality of the at least one secondary air passage are arranged at a uniform angular spacing relative to each other.

17. The filter element according to claim 12, wherein the filter medium body comprises a star-shaped folded filter medium.

18. The filter element according to claim 17, wherein a plurality of the at least one secondary air passage are arranged in an annular arrangement about the primary air passage, wherein the star-shaped folded filter medium comprises a first fold height measured in the radial direction in a region of the plurality of the at least one secondary air passage and a second fold height measured in the radial direction between the plurality of the at least one secondary air passage, wherein the first fold height is smaller than the second fold height.

19. The filter element according to claim 12, wherein the channel is delimited in the radial direction inwardly by a circumferentially extending inner wall section of the end disk projecting axially away from the end disk, wherein the inner wall section is arranged, viewed in the radial direction, inwardly of the at least one secondary air passage.

20. The filter element according to claim 19, further comprising a first seal device held at the circumferentially extending inner wall section.

21. The filter element according to claim 20, wherein the first seal device is molded onto the circumferentially extending inner wall section.

22. The filter element according to claim 20, wherein the first seal device comprises at least one radially inner seal surface arranged on a radially inner wall surface of the circumferentially extending inner wall section and further comprises at least one radially outer seal surface arranged on an outer wall surface of the circumferentially extending inner wall section.

23. The filter element according to claim 20, wherein the channel is delimited in the radial direction outwardly by a circumferentially extending outer wall section of the end disk projecting axially away from the end disk, wherein the circumferentially extending outer wall section is spaced apart from the circumferentially extending inner wall section by a predetermined measure in the radial direction.

24. The filter element according to claim 23, further comprising a second seal device held at the circumferentially extending outer wall section.

25. The filter element according to claim 24, wherein the second seal device comprises at least one radially inner seal surface arranged at a radially inner wall surface of the circumferentially extending outer wall section and/or at least one radially outer seal surface arranged at a radially outer wall surface of the circumferentially extending outer wall section.

26. The filter element according to claim 24, wherein the second seal device is molded onto the circumferentially extending outer wall section.

27. The filter element according to claim 19, wherein the end disk projects in the radial direction inwardly past an inner circumference of the filter medium body and forms a projecting region, wherein the circumferentially extending inner wall section is arranged at least partially in the projecting region.

* * * * *